United States Patent [19]

Sako et al.

[11] Patent Number: 4,907,215
[45] Date of Patent: Mar. 6, 1990

[54] INTEGRAL OPTICAL RECORDING OF PRODUCT CODE IN DATA AREAS

[75] Inventors: Yoichiro Sako; Hiroshi Ogawa, both of Tokyo; Yoshihiro Tsukamura, Kanagawa, all of Japan

[73] Assignee: Sony Corporation, Tokyo, Japan

[21] Appl. No.: 88,149

[22] Filed: Aug. 21, 1987

[30] Foreign Application Priority Data

Aug. 27, 1986 [JP] Japan .................................. 61-200827
Aug. 30, 1986 [JP] Japan .................................. 61-204405

[51] Int. Cl.⁴ ........................ G11B 7/007; G06F 11/10
[52] U.S. Cl. ...................................... 369/59; 360/40; 360/48; 371/50.1
[58] Field of Search .................. 369/59; 360/48, 40; 371/38, 50

[56] References Cited

U.S. PATENT DOCUMENTS

| | | | |
|---|---|---|---|
| 4,534,031 | 8/1985 | Jewer | 369/59 |
| 4,688,225 | 8/1987 | Fukami et al. | 371/38 |
| 4,694,456 | 9/1987 | Morita et al. | 369/59 |
| 4,698,810 | 10/1987 | Fakuda et al. | 369/59 |
| 4,769,819 | 9/1988 | Matsutani et al. | 371/38 |
| 4,785,451 | 11/1988 | Sako et al. | 371/37 |
| 4,794,602 | 12/1988 | Tanaka et al. | 371/38 |
| 4,799,221 | 1/1989 | Fukami et al. | 371/38 |

*Primary Examiner*—Vincent P. Canney
*Assistant Examiner*—Kevin J. Fournier
*Attorney, Agent, or Firm*—Philip M. Shaw, Jr.

[57] ABSTRACT

There is disclosed a method for optically recording data in data areas of a disk-like recording medium in which servo signal areas are formed along the track in alternation with data areas. Parity codes for error correction are generated and affixed in at least one direction, that is, in the column or row direction, of a two-dimensionally arrayed data block, and the two-dimensionally arrayed data affixed with the parity codes are supplied sequentially to an optical pickup along any one of the column and row directions so as to be recorded in respective ones of said data areas. The number of the data in the direction of reading of the two-dimensionally arrayed data is selected to be an integer times the data number that can be recorded in each data area provided on said disk-like recording medium, when the former is intended to be greater than or equal to the latter, or the data number that can be recorded in each such data area is selected to be an integer times the number of the data in the direction of reading of the two-dimensionally arrayed data when the inverse relation is intended.

7 Claims, 7 Drawing Sheets

INTEGRAL OPTICAL RECORDING OF PRODUCT CODE IN DATA AREAS

BACKGROUND OF THE INVENTION

1. Field of the Invention

This invention relates to a method for optically recording data in data areas of a disk-like recording medium in which servo signal areas are formed along the track in alternation with the data areas.

2. Description of the Prior Art

Various methods have evolved for recording data on the disk-like recording media using an optical method. Examples of such recording media include those of the so-called read only memory or ROM in which signals are nonrewritably formed by the supplier for supply to users, similarly to digital audio disks such as compact disks (CDs) or video disks, of the so-called programmable ROM or PROM type also known as direct read after write (DRAW) or write-once type in which data can be rewritten only once by the user, and those of the so-called random access memory (RAM) type in which recorded signals can be erased and rewritten, such as opto-magnetic disks. These recording media are characterized by an extremely large recording capacity.

Since these recording media have evolved at different times, signals are recorded on some of these media using distinct signal formats resulting in lack of interchangeability among these different types of the recording media. Since this is troublesome both to the suppliers and the users, the demand for unifying the format has been raised by both the users and the suppliers. As one of the technologies for implementing this unified format, it has been proposed to introduce the concept of the so-called sampling servo according to which servo signals are recorded at a predetermined interval or a predetermined angle on concentric tracks or a spirally extending track on the disk, similarly to the so-called sector servo for the hard disk in the field of the magnetic disk. These discrete servo signals are sampled and held during the rotational driving of the disk to effect a continuous servo control operation. Data signals are sequentially recorded between the adjoining servo signals such that the recording areas for servo signals and those for data signals are alternately provided along the track direction, that is, the scanning direction of the pickup head.

The number of the servo signals formed on the complete perimeter of the disk in the above proposed format is limited by factors such as the rotational speed of the disk or the servo control characteristics. The current practice is to provide one thousand and several hundreds of servo signals, for example, along the complete perimeter of the disk.

It should be noted that the storage capacity of the optical disk is as large as several hundred megabytes, for example, such that it becomes critical to take measures against occurrence of possible errors, such as burst errors. For this reason, the conventional practice is to add error detection or error correction codes to the record data. In copending Japanese Patent Application No. 93892/1986, there has been proposed a data transmission method according to which the data to be transmitted and the additional information affixed to the tail of these data are arrayed two-dimensionally, and first error correction codes are formed for the data of each row, that is, the data extending in one direction, of the two dimensional array, while second error correction codes are formed for the data of each column, that is, the data extending in another direction, for providing a so-called product or matrix code configuration. During recording, data are sequentially read out in the row direction of the product code for sequentially recording the read-out data on the disk.

For purposes of this discussion, it is now assumed that the lengths of the servo signal area and the data area on the disk are equal, respectively, to 2 and 16 bytes in terms of the data numbers, and that the serial length in the row direction of the product code, that is, the length of each row, is equal to, for example, 52 bytes.

In this case, when sequentially recording the data of the product code configuration along the row direction of the respective data areas, the points of data demarcation by the respective servo signal areas are changed from row to row such that there may be caused a situation in which data that may exist across two rows of the product code is recorded in a single data area.

Thus, when a servo signal read error is caused during signal reproduction, even in cases where only one servo signal can not be read correctly so that the data within a single data area has been regarded as the error, the error exists across two rows of the product code, so that there is a lowered error correction ability in the column direction.

It has also been known to use a code system in which each data sector of the disk 1 is arrayed in a two-dimensional matrix of m rows and n columns, the error correction codes are added to each data string in the row direction and the data reading and writing is performed in the column direction. Such a code system is also known as the long distance code or LDC since the length of the data string in the direction of generation of the correction codes, that is the row direction, is rather long, for example, about 100 bytes, the number of interleaves being m which is the number of the columns in the matrix.

When the two-dimensionally arrayed data of the LDC are read out sequentially along the column direction so as to be sequentially recorded in the data areas between the servo signal areas, with the data number in the data area being k, the data sequentially read by groups of m in the column direction are recorded after they are divided at intervals of data lengths k.

In such a case, when the read-out errors of the servo signals are produced during the signal reproduction, and a servo signal cannot be read out correctly so that the data in a particular data area is determined to be in error, the error correcting capability in the row direction of the two-dimensionally arrayed data is lowered.

OBJECT AND SUMMARY OF THE INVENTION

It is an object of the present invention to provide for effective error correction of data recorded in data areas provided on a disk-like recording medium in alternation with servo signal areas.

It is another object of the present invention to simplify error correction processing of data reproduced from a disk-like recording medium.

In accordance with the present invention, parity codes are generated and added for correcting the errors along at least one direction, that is, in the column or row direction, of a two dimensionally arrayed data block. The two-dimensionally arrayed data with the addition of the parity codes are sequentially supplied along one direction of the array to an optical pickup so as to be recorded in said respective data areas. In such case, the number m of units of data in the direction of reading of the two-dimensionally arrayed data is selected to have an integer relationship with the number k of units of data that can be recorded in each data. When m is intended to be greater than or equal to k, then $m = N \times k$, where N is an integer. When the inverse relation is intended, the data number k that can be recorded in each data area is selected to be an integer times the number m of the data in the direction of reading of the two-dimensionally arrayed data.

BRIEF DESCRIPTION OF THE INVENTION

DESCRIPTION OF THE PREFERRED EMBODIMENTS

In the accompanying drawings, there are shown preferred illustrative embodiments of the present invention in which the data recording method of the present invention is applied to recording the data on the opto-magnetic disk.

Figure 1:
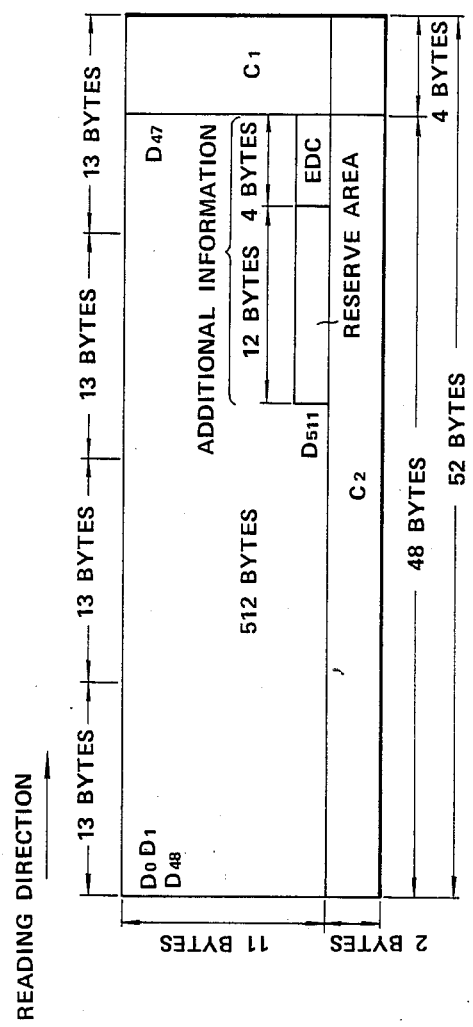
FIG. 1 shows the data configured in the product code.
Figure 2:
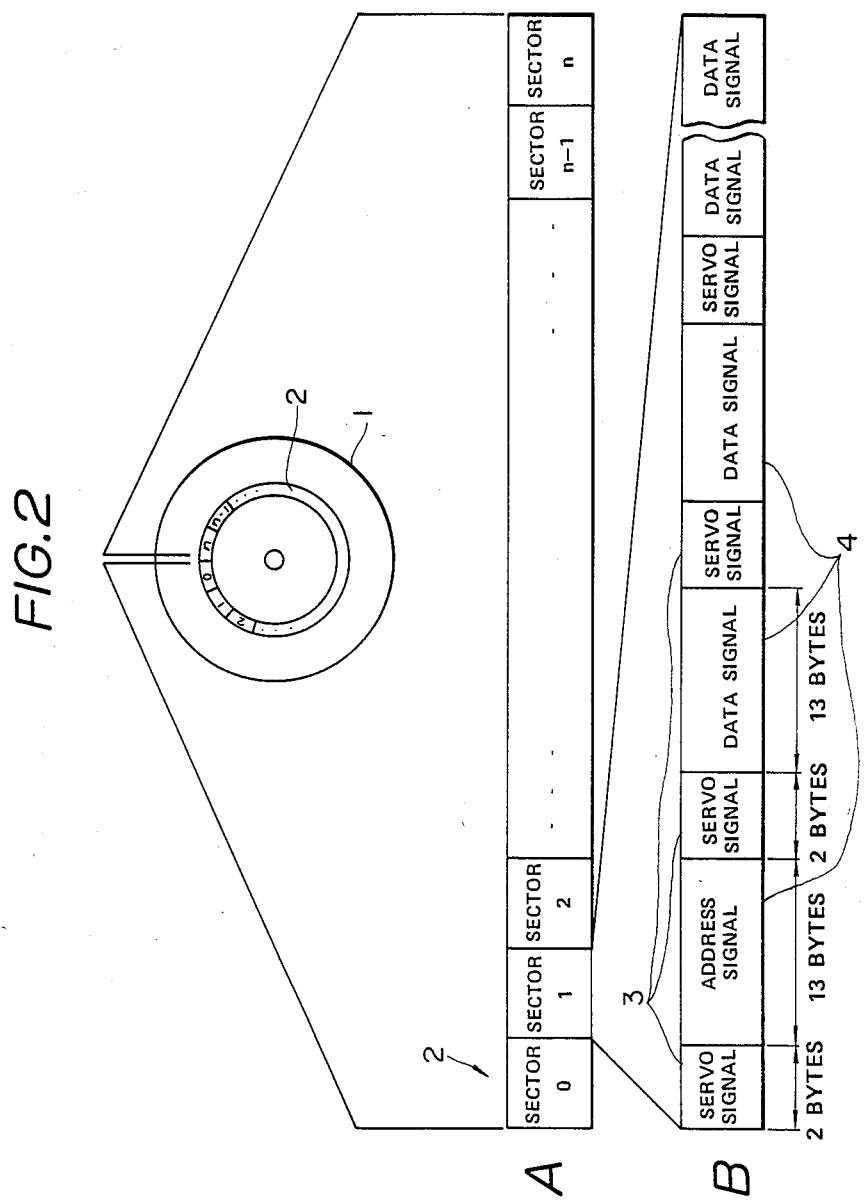
FIGS. 2A and 2B show the data format on the disk-like recording format.

FIG. 1 shows what is called the product code design of the data recorded in each sector of the opto-magnetic disk to be recorded in the present embodiment, and FIG. 2 the recording format of the data on the opto-magnetic disk 1. Referring first to FIG. 2, between servo signal areas 3 in which servo signals are recorded in the form of so-called pits, there are formed data areas 4 in which the data or address information are written, these areas 3 and 4 being alternately provided along a track 2 of the opto-magnetic disk 1. The length of the servo signal area 3 and that of the data area 4 may for example be 2 and 13 bytes, respectively. The data recorded sequentially in each data area 4 are arrayed by the product code or matrix code configuration shown in FIG. 1. The serial length of the product code in one direction, that is, in the row direction, is selected to be equal to an integral number times the length of the data area 4 between the servo signal areas 3 in FIG. 2. For example, it is selected to be 52 bytes for the length of the data area 4 of 13 bytes in the present example. Thus, four blocks of data to be recorded in the data area 4 are arrayed in each row of the product code without excess or deficit such that no data recorded in one data area 4 will lie in two adjoining rows of the product code.

Data Structure for One Sector (FIG. 1)

The product code configuration of each sector data to be recorded on the opto-magnetic disk in accordance with the product code configuration, will be described by referring to FIG. 1.

In the opto-magnetic disk, a 512-byte data volume is adopted as a reference or standard unit data volume to be recorded in each sector of the recording track, in consideration that the disk is used for example as the data recording medium for computers. FIG. 1 shows a typical data structure for the case of one sector consisting of 512 bytes. Although the valid data are the 512 bytes of data $D_0$ to $D_{511}$ shown in FIG. 1, 16-bytes of additional information are affixed to the tail of these data D0 to D511 of FIG. 1, making a total of 528 bytes. These 528 bytes are divided into 48 bytes for each row and arrayed two-dimensionally so that 48 bytes make up one row and 11 bytes make up one column ($48 \times 11 = 528$). That is, the data are arrayed in a two-dimensional matrix consisting of 11 rows and 48 columns. Among the 16 additional bytes, 12 bytes represent reserve information, such as the data identification information indicating data kinds or the link information with the next sector. For the data of the 524 bytes including these reserve area data, a 4-byte error detection code or EDC is generated and provided in the last 4-byte area of the additional 16-bytes of information, for a total of 528 bytes.

For each of the 48-byte rows of data of the two-dimensionally arranged 528-bytes of data, there is generated and affixed a first 4-byte error correcting code $C_1$ and, for each of the 11-bytes of column data of the two-dimensionally arrayed 572-bytes of data, there is generated and affixed a second 2-byte error correcting code $C_2$ for forming a 13-row, 52-column product code consisting of 676 bytes. As these first and second error correction codes, a $C_1$ (52,48) Reed Solomon code or a $C_2$ (13,11) Reed Solomon code, for example, is used. The two-dimensionally arrayed data of the product code configuration may be read sequentially in the row direction, for example, so as to be recorded in the respective data areas of the disk.

Recording Format (FIG. 2)

The track recording format and the recording pattern on the opto-magnetic disk of the two-dimensionally arrayed data of the aforementioned product code configuration, will be described hereafter in more detail.

Referring to FIG. 2, the opto-magnetic disk 1 of, for example, the so-called 5-inch type is approximately 13 cm in diameter and has a memory capacity of, for example, 300 Mbytes on each side. The disk 1 is revolved at a constant angular velocity and, assuming that a track 2 is formed for each revolution of the disk 1, data are recorded on concentric tracks or a spirally extending track. The number of tracks 2 on each side is about 18000 to 20000 with each track being divided into (n+1) sectors, such as 32 sectors. As shown to an enlarged scale in FIG. 2B, the sector format is formed by alternation of the servo signal areas 3 and data areas 4 where the pits for servo control and data or address information are recorded, respectively. In the data area at the leading end of each sector, address information such as the sector addresses are recorded in the form of, for example, the aforementioned pits. The length of the servo signal area 3 and that of the data area 4 may for example be 2 and 13 bytes, respectively. Thus, since the data volume of the product code for one sector is 676 bytes in the present embodiment, each data sector is recorded using 52 (=676/13) data areas 4. To the resulting data is added one data area 4 for address information recording, so that one sector is completed by 53 sets of the servo signal areas 3 and the data areas 4.

It will be noted that, since the serial length in the row direction of the product code of FIG. 1 is 52 bytes and the data number, i.e. data capacity of one data area 4 is 13 bytes, the data of 4 data areas 4 is allocated to each row without deficit or excess such that no data of any one data area 4 will lie over two rows of the product code.

Figure 3:
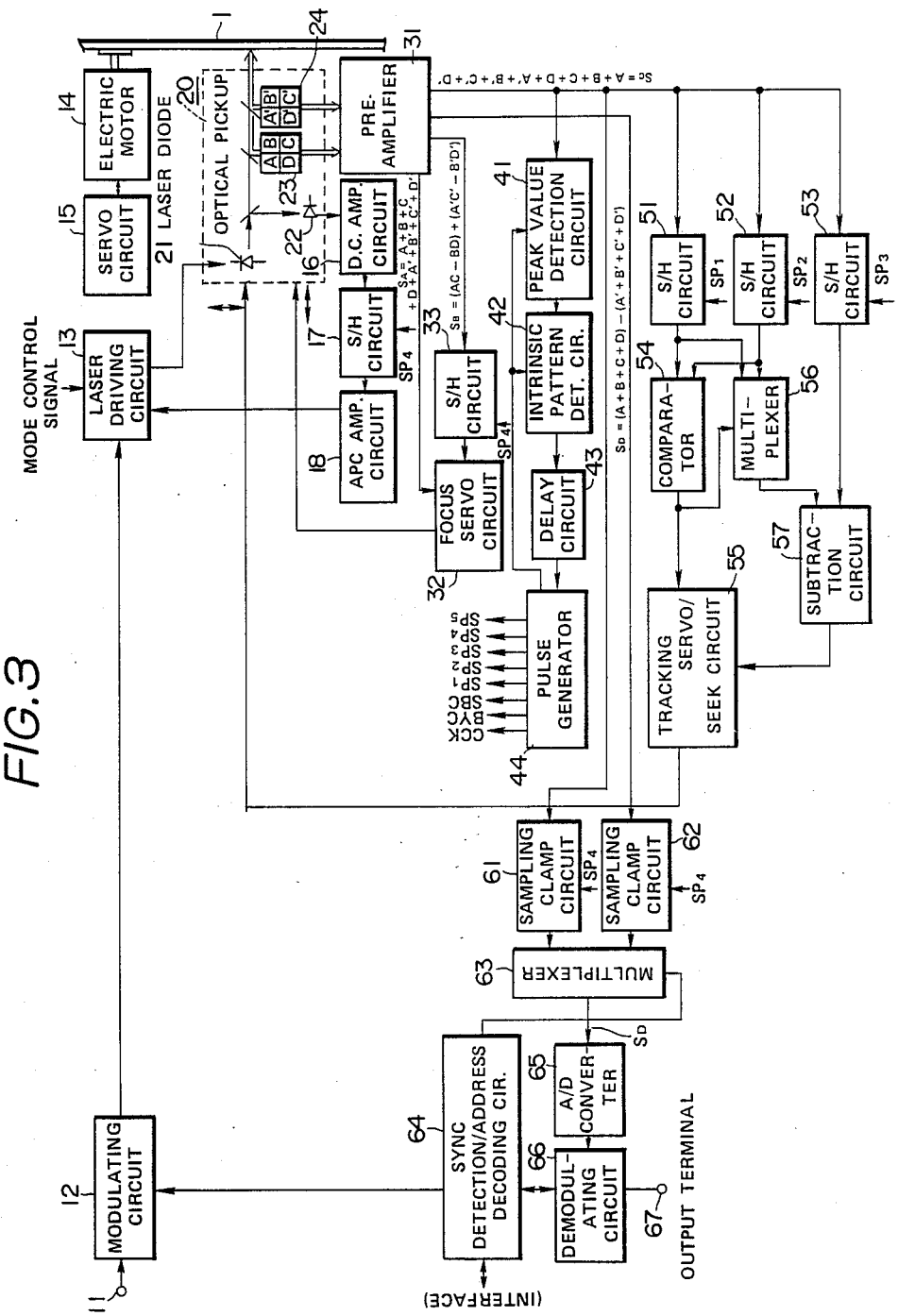
FIG. 3 is a block diagram showing the disk drive in its entirety.

Opto-magnetic disk device (FIG. 3)

The overall structure of the opto-magnetic disk device for realizing the recording method of the present invention will be hereafter described by referring to the accompanying drawings.

Referring to FIG. 3, the data to be recorded, that is, the two-dimensionally arrayed data of the aforementioned product code configuration is read out in the row direction row by row so as to be supplied from, for example, an electronic computer to an input terminal 11, by way of an interface, not shown. These input data are supplied to a modulating circuit 12 where they are subjected to a predetermined modulation, such as bit conversion, before being supplied to a laser driving circuit 13. To this circuit 13 are supplied control signals from said interface corresponding to write, read or erasure modes. In accordance therewith, the driving circuit 13 outputs signals for driving a laser diode 21 of the optical pickup 20, such that driving pulse signals having the timing of channel clocks used as reference clocks and high frequency drive signals are supplied to the laser diode 21 during data recording and erasure and during data reading, respectively.

The optical pickup 20 has, in addition to the laser diode 21, a photodiode 22 and two photodetectors 23, 24, each being divided into four sections. The photodetector 22 detects the intensity of the laser light emitted by the laser diode 21. The photodetectors 23, 24 detect the light reflected from the laser light by the optomagnetic disk 1, through light sensors, not shown. One of the photodetectors senses the positive direction component while the other senses the negative direction component of the Kerr rotation angle.

An electrical motor 14, under the control of a servo circuit 15 which includes, for example, a phase locked loop (PLL), causes the disk 1 to revolve accurately at a prescribed angular velocity.

The laser light outputted from the laser diode 21 is irradiated onto the opto-magnetic disk 1 while also falling on the photodiode 22. The output from the photodiode 22 proportionate to the intensity of the laser light is supplied through a d.c. amplifier circuit 16 to a sample hold (S/H) circuit 17. In this circuit 17, a sample hold operation is performed by sampling pulses $SP_4$ and the output of the circuit is supplied as automatic power control (APC) pulses to the laser drive circuit 13 through an APC amplifier circuit 18. In such manner, the intensity of the laser light outputted from the laser diode 21 is maintained at a prescribed value.

The outputs from the photodetectors 23 and 24 of the optical pickup 20, upon which the reflected laser light from the disk 1 falls, are supplied to a preamplifier 31. The sum signal of the outputs of the light receiving sections of the photodetectors 23, 24, or the light detection signal $S_A = A+B+C+D+A'+B'+C'+D'$, inclusive of a direct current component, is directly supplied from the preamplifier 31 to a focus servo circuit 32, while another light detection signal $S_B = (AC-BD) + (A'C'-B'D')$ formed from the outputs from the respective light receiving areas is also supplied from the preamplifier to the focus servo circuit 32 through a S/H circuit 33 adapted to perform a sample hold operation by the sampling pulses $SP_4$. Focus servo signals generated in the focus servo circuit 32 on the basis of the signals $S_A$ and $S_B$ are supplied to the optical pickup 20 to effect focusing control in a known manner.

Still another light detection signal $S_C = A+B+C+D+A'+B'+C'+D'$ from the preamplifier 31 is supplied to a peak detection circuit 41, S/H circuits 51, 52 and 53 and to a sampling clamp circuit 61. The light detection signal $S_C$ represents the pit or indentation pattern detection signal in the servo signal area 3 and the data area 4 of the disk 1 where only the aforementioned address information is recorded. In the peak value detection circuit 41, the peak value of the light detection signal $S_C$ is detected. In an intrinsic pattern detection circuit 42, prescribed pit patterns of the servo signal area 3 are detected, with the detected output being supplied through a delay circuit 43 to a pulse generator 44, where channel clock pulses CCK as the reference clocks timed to prescribed pits of the aforementioned pit pattern and byte clocks BYC as well as servo byte clocks SBC and sampling pulses $SP_1$, $SP_2$, $SP_3$, $SP_4$ and $SP_5$ are generated and outputted on the basis of detection outputs produced at an intrinsic pattern detection circuit 42. The channel clocks CCK are supplied to all circuit blocks, although it is not shown in the drawings. The sampling pulses $SP_1$, $SP_2$ and $SP_3$ are supplied to the S/H circuit 51, 52 and 53, respectively. The sampling pulse $SP_4$ is supplied to the aforementioned S/H circuits 17 and 33, while being also supplied to sampling clamp circuits 61 and 62. It is noted that the sampling pulse $SP_5$ is used for example for detecting the moving direction of the optical pickup 20. It is noted that gating pulses are also supplied from the pulse generator 44 to the peak value detection circuit 4' and to the intrinsic pattern detection circuit 42.

In each of the S/H circuit 51, 52 and 53, a sample and hold operation of the supplied light detection signals $S_C$ is performed by the sampling pulses $SP_1$, $SP_2$ and $SP_3$. The signal levels output from the S/H circuit 51 and the S/H circuit 52 are compared by a comparator 54. The resulting comparison output is supplied as the traverse count signals to a tracking servo/seek circuit 55, while being also supplied to a multiplexer 56. From the multiplexer 56, the signal from the S/H circuit 51 or 52 having a higher level is outputted and supplied to a subtraction circuit 57. In the subtraction circuit, a difference signal between the signal from the multiplexer 56 and that from the S/H circuit 53 is formed and supplied as the tracking error signal to the tracking servo/seek circuit 55. Both the tracking control and the feed control of the optical pickup 20 are performed in the tracking servo/seek circuit 55.

The light detection signal $S_C$ and the light detection signal $S_D = (A+B+C+D) - (A'+B'+C'+D')$ are supplied from the preamplifier 31 to the sampling clamp circuit 61 and 62, respectively. The light detection signal $S_D$ represents the detection signal of the data written in the data areas 4 of the disk 1. On the other hand, the light detection signal $S_C$ supplied to the sampling clamp circuit 61 is the address detection signal written into the area 4 once for each sector in the form of the aforementioned pits. In the sampling clamp circuits 61 and 62, the signals are clamped by the sample pulses $SP_4$ before being supplied to a multiplexer 63.

The changeover/selection operation of the multiplexer 63 is controlled by control signals from a sync detection/address decode circuit 64. It is assumed for example that the light detection signal $S_C$ is supplied through the sampling clamp circuit 61 and the multiplexer 63 to an analog/digital (A/D) converter 65 for conversion into digital data and the thus converted digital data are supplied to a demodulating circuit 66. In this case, the output from the demodulating circuit 66 is supplied to a sync detection/address decoding circuit 64 for detecting the sync signals and decoding the address information. The arrangement is so made that, in accordance with the address information of the data to be read that are supplied through an interface from the computer, the multiplexer 63 is changed over when the address information coincides with the actual address, whereby a light detection signal SD for the data area 4 is supplied through an A/D converter 63 to the demodulating circuit 66 and data produced as a result of the demodulation processing, including bit conversion, are outputted at an output terminal 67. These output data are supplied through an associated interface to an electronic computer. During data writing, control signals are supplied from the sync detection/address decoding circuit 64 to the modulating circuit 12 and the data to be written are supplied from the modulating circuit 12 to the laser drive circuit 13 in accordance with these control signals.

It should be noted that the changeover control operation for the multiplexer 63 does not occur in one area 4 but occurs necessarily within the scanning time for the servo signal area 3. This is because the two-dimensionally arrayed data of the product code may be divided by the length of the data area 4 without producing data fragments such that it becomes unnecessary to make recording of the data and address information in an admixture in the data area 4. In such manner, the changeover switching operation between the data and the address information during reproduction does not occur in the data areas between the servo signals, such that, even when the data transfer rate is increased due to an increased disk speed, a changeover operation between the address and data signals can be performed with sufficient allowance.

Figure 4:
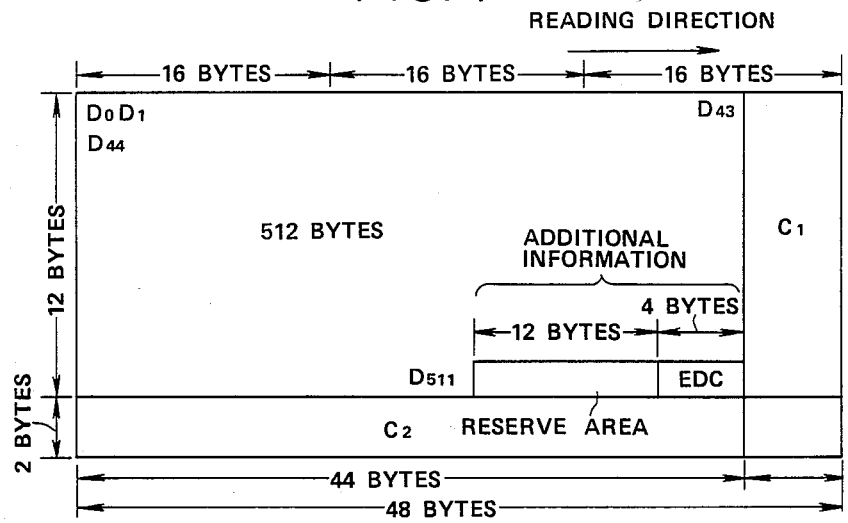
FIGS. 4 and 5 show a block of data configured in alternative product codes.
Figure 5:
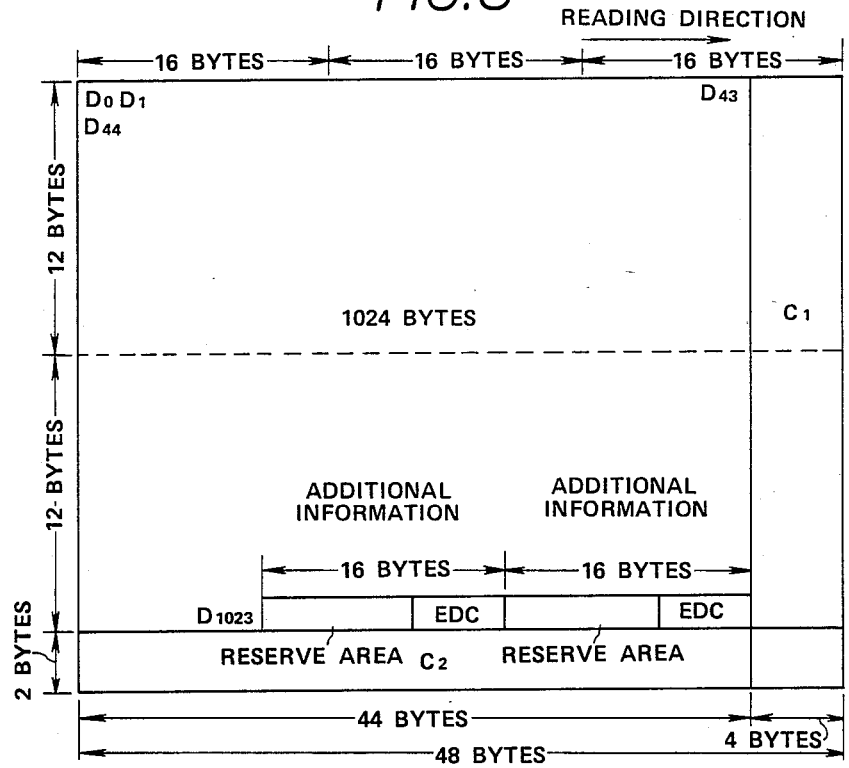

Other Embodiments (FIGS. 4 and 5)

FIG. 4 shows a product coded data configuration to be recorded in one sector according to a modification of the present invention. The length of the servo signal area and that of the data area on the track of the opto-magnetic disk used as the recording medium are set to 2 and 16 bytes, respectively.

Referring to FIG. 4, 16-bytes of additional information is added to the tail of the 512-byte one-sector of valid data $D_0$ to $D_{511}$ to give a sum total of 528 bytes that are divided at intervals of 44 bytes for providing a two-dimensionally arrayed matrix data formed by 44 bytes in the row direction and 12 bytes in the column direction. It is noted that, similarly to the above described embodiment of FIG. 1, 16-bytes of additional information is formed by 12-bytes of reserve information and a 4-byte error detection code EDC. A 4-byte first error correction code $C_1$ is generated and added to each 44-byte row of the thus produced two-dimensionally arrayed data, while a 2-byte second error correction code $C_2$ is generated and added per each 12-byte column for forming the product code composed of the 14-row 48-column two-dimensionally arrayed data. As the first and second error correction codes, $C_1$ (48,44) or $C_2$ (14,12) Reed Solomon codes, for example, may be employed. The two-dimensional data array having the aforementioned product code configuration is read row by row along the row direction so as to be sequentially recorded in the respective 16-byte data areas of the disk.

In the embodiment of FIG. 4, the data number in each data area is 16 bytes and the serial length or data string length of the product code in the row direction is 48 bytes, three consecutive data areas can be allotted to each row without data excess or deficiency such that no data in any one data area are situated across two rows of the product code.

FIG. 5 shows another product coded data configuration with the data size of 1024 bytes. In the present embodiment, 16-bytes of additional information are added to the former half 512 bytes of data and the latter half 512 bytes of data of the 1024 bytes of data, with the resulting 1056 bytes of data being arranged in a 44-column, 24-row two-dimensional data matrix or array. In the present embodiment, the additional 16-bytes of information for the former half 512 bytes of data and the additional information for the latter half 512 bytes of data are provided in the latter portion of the last row (24th row) of the 44-column, 24-row two-dimensionally arrayed data.

Similarly to the embodiment of FIG. 4, a first error correction code, such as $C_1$ (48,44) Reed Solomon code, is generated and affixed to each row and a second error correction code such as the $C_2$ (26,24) Reed Solomon code is generated and affixed to each column of the two-dimensional data array such that the product code is formed by a sum total of 1248 bytes in a 48-column, 26-row, two-dimensional data array. It is noted that three consecutive data areas can be allotted to each row of the product code such that no data of the product code of one data area is arrayed across two rows.

The serial length in the row direction of the product code in terms of bytes can be selected to be a numerical figure having a larger number of divisors, such as the above 48 bytes having eight divisors, namely 24, 16, 12, 8, 6, 4, 3 and 2, for dealing more readily with a situation which might arise when a change has been caused in the disk format, above all, in the interval between servo signals or in the number of data in the data area. For example, in the case of a disk of, for example, 3.5 inch type, when it is desired to select the number of servo signals per each disk revolution so as to be approximately equal to that of the aforementioned 5-inch type, such as about 1300 to 1400 per each revolution, the interval between the respective servo signals will become narrower because of the generally smaller track diameter so that it becomes difficult to record data of as many as 16 bytes in each data area. For this reason, it may become necessary to change the format so that the number of recording bytes for the data area is equal to, for example, 12 bytes. Even when the format is changed in this manner, the byte number of 48 of the serial length in the row direction of the product code can be divided by the byte number of 12 which is the data number of the data area after such format change such that each row data can be allocated to the four data areas without excess or deficit.

In FIGS. 6 to 10, modified code configurations are shown, in which a block of data is to be recorded in each sector of the disk-like recording medium. Such code configuration is known as what is called the long distance code or LDC.

In FIGS. 6A and 6B, there is shown an example of the data structure wherein 512 bytes of data is recorded in each sector. In FIG. 6A, there is shown a data configuration for one sector and, in FIG. 6B, a portion of the data zone shown in FIG. 6A is shown to an enlarged scale, wherein SV stands for an interval between adjoining servo signals. Each data area 4 between servo signals SV comprises 16 bytes. In these figures, the valid data is 512 bytes, to the tail of which 16-bytes of additional information is affixed to give a sum-total of 528 bytes, which are then divided into groups of 4 bytes in accordance with the data number of each column and arrayed two-dimensionally so that 4 bytes make up one column and 132 bytes make up one row ($4 \times 132 = 528$). Examples of the additional information of 16 bytes include reserve information such as link information with the next sector or data identification information showing the data kinds and an error detection code EDC generated for the aforementioned 512-bytes of data.

To each 132-bytes of row data of the 528-byte two-dimensionally arrayed data, a 16-byte error correction code ECC is generated and added to give 592-bytes of data which is arrayed in a so-called long distance code or LDC composed of 4 rows and 148 columns. As such an error correction code, a C (148, 132) Reed Solomon code is employed, as an example. The two-dimensionally arrayed data of the LDC configuration is read in the column direction and sequentially recorded in the respective data areas 4 on the disk.

It will be noted that, between the serial length m (equal to 4 bytes) in the column direction of the two-dimensionally arrayed data and the number k (equal to the 16 bytes of the data area 4), there exists a relation in which one of k and m is equal to an integer times the other. In the present case, k is equal to four times m ($k=4m$). As a result, the data in one data area 4 are allocated to four data columns of the two-dimensional data array without excess or deficit, such that, when the servo signals cannot be read and the data in one data area 4 is considered to be in error, there does not arise a situation in which said error data pass over to the next column beyond the boundary of the four columns of the data array, with the result that the number of error symbols to be corrected may be prevented from increasing so that deterioration in the error correction ability may be reduced.

It will be noted that the track recording format as well as the recording pattern on the opto-magnetic disk on which are recorded the two-dimensionally arrayed data of the LDC configuration is similar to those shown in FIG. 2.

Thus, in the long distance code configuration of the present embodiment, since the volume of the data per sector of the two-dimensional data array is 592 bytes, each sector data is recorded using 37 data areas 4 to which one data area 4 is added for recording the address information. In such manner, one sector is constituted by 38 sets of the servo area 3 and the data areas 4.

Figure 6:
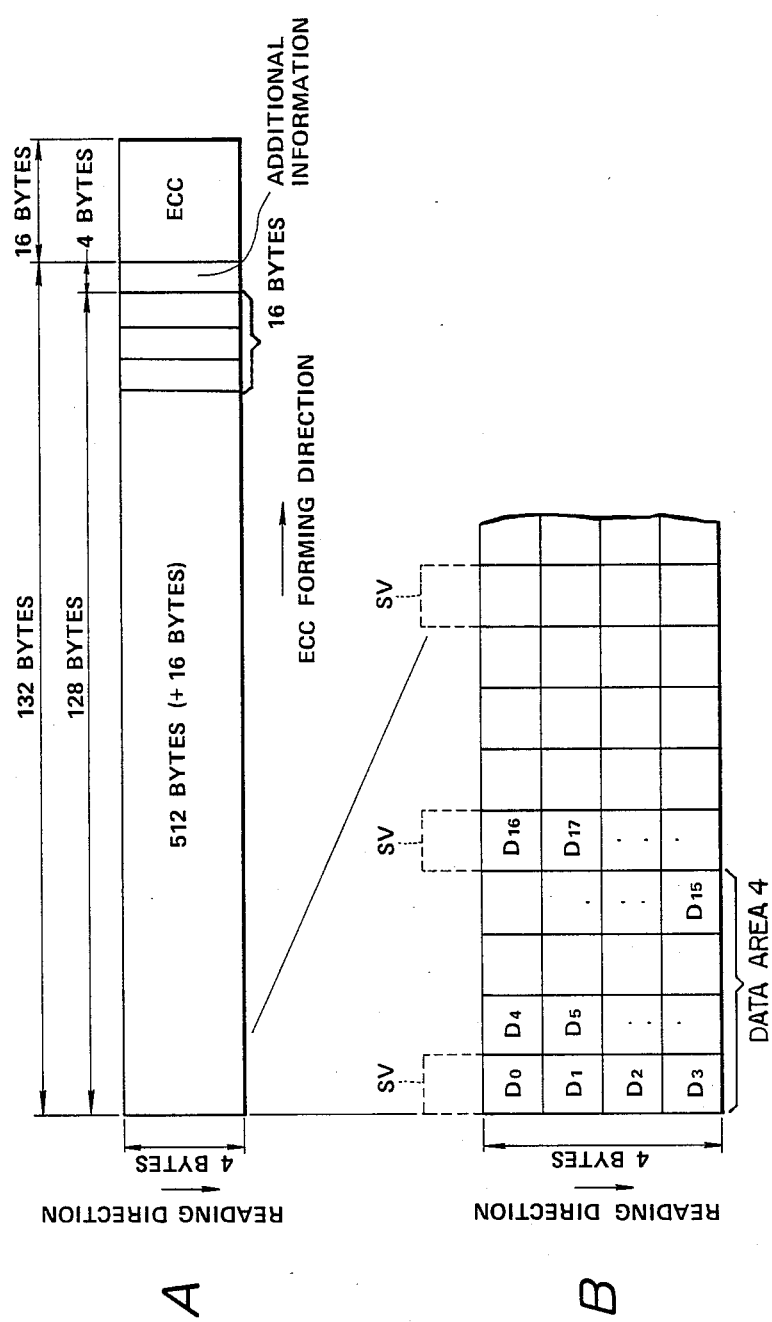
FIGS. 6A and 6B show the configuration of the long distance coded data.

Since the data number m in the column direction of the two-dimensional data array of FIG. 6 is 4 bytes, while the data number k of one data area 4 is 16 bytes, the data formed by groups of 4 columns may be allotted in each data area 4 without excess or deficit.

In such manner one servo signal SV is placed at each fourth column of the two-dimensional data array, as shown by broken lines in FIG. 6B. Thus, even when it is impossible to read out the servo signals, for example, the data can be rearranged rather easily for performing the error correction as desired.

Several other embodiments for arranging the block of data into a long distance code will be hereafter described by referring to the accompanying drawings. For simplicity of the description, the opto-magnetic disk 1 having the recording format similar to that shown in FIG. 2 is used as the recording medium; and the length k of the data area 4 interposed between the adjoining servo signal areas 3 is set so as to be equal to 16 bytes.

Figure 7:
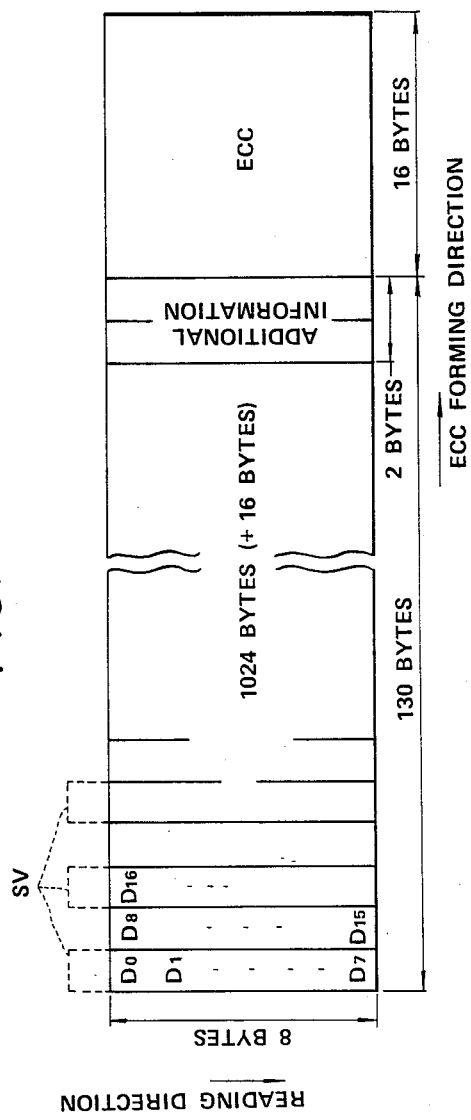
FIG. 7, 8, 9 and 10 show modified configurations of the long distance coded data.

FIG. 7 shows the data configuration according to a second embodiment for long distance coding with the data size for one sector being 1024 bytes.

Referring to FIG. 7, 16-bytes of additional information is affixed to the tail of a valid one-sector data of 1024 bytes to give 1040 bytes, which are then divided into groups of 8 bytes along the column direction. In such manner, there is formed a two-dimensional data array consisting of 8 bytes in the column direction and 130 bytes in the row direction. Similarly to the embodiment shown in FIGS. 6A and 6B, the 16-bytes of additional information is constituted by, for example, the reserve information and an error detection code EDC. A 16-byte error correction code ECC such as (146, 130) Reed Solomon code, is generated and affixed to each 130-byte row of the thus-produced two-dimensional data array for constituting the so-called LDC data. The two-dimensional data array of the LDC configuration is sequentially read out in the column direction so as to be sequentially recorded n each 16-byte data area 4 of the disk.

In the embodiment of FIG. 7, since the serial length m of the two-dimensional data array is 8 bytes and the length k of the data array is 16 bytes, the relation $m:k=1:2$ holds, so that two column of the two-dimensional data array can be allocated to each data area without excess or deficit. The servo signal SV is then allocated to each two columns of the two-dimensional data array as indicated by the broken lines in FIG. 7.

Figure 8:
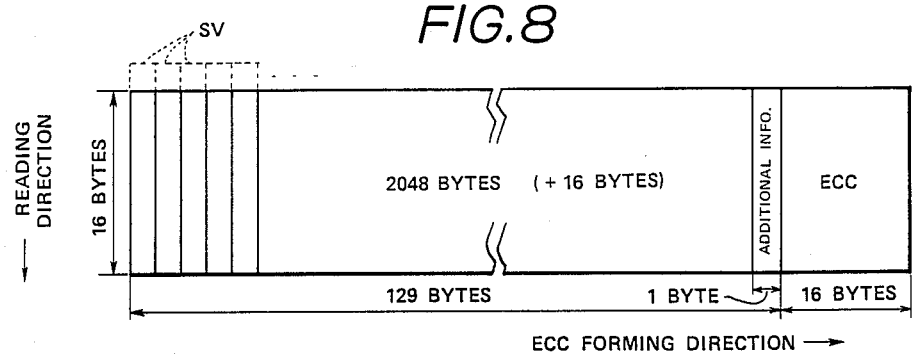

When the size of the data to be recorded in one sector is 2048 bytes, the data number m for one column may be set to 16 bytes, as in an embodiment shown in FIG. 8. In this embodiment, 16-bytes of additional information, which includes an error detection code (EDC) is added to the 2048-bytes of data to give a total of 2064 bytes. A 16-byte error correction code ECC is generated and affixed to each 129-byte row of the data array. The data number k (16 bytes) is equal to the data number (16 bytes) in the column direction ($m:k=1:1$) so that each column of the two-dimensional data array may be allotted to each data area without excess or deficit, while each servo signal SV is allocated to each column of the data array as indicated by the broken line of FIG. 8.

Figure 9:
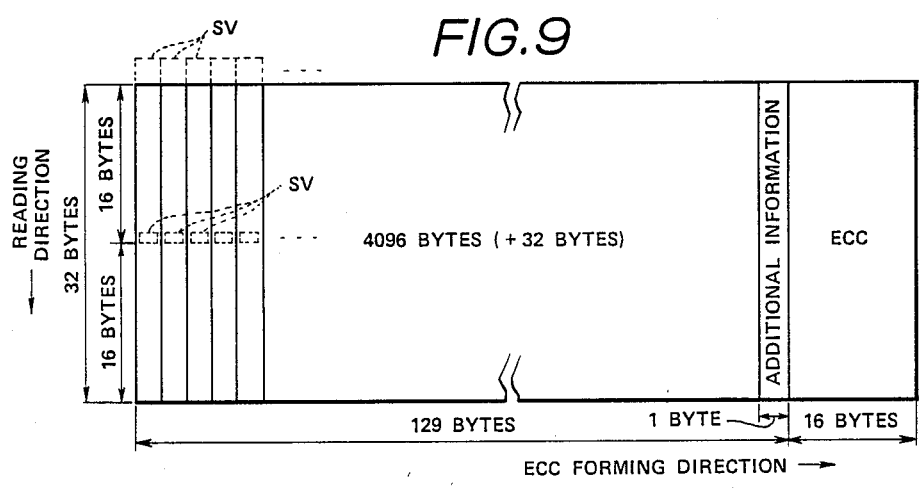
Figure 10:
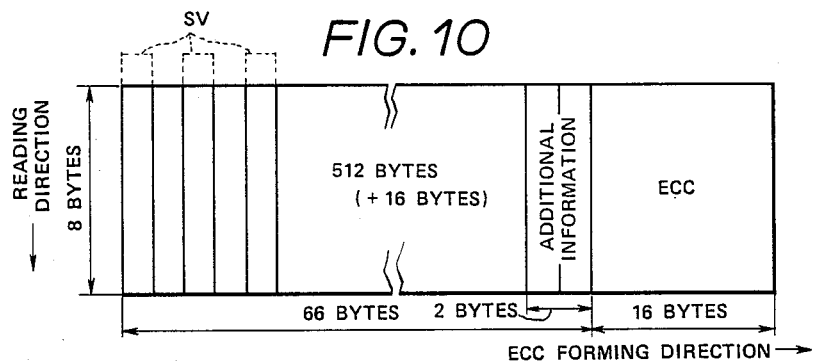

FIG. 9 shows an example of the data structure for the case in which the size of the data recorded in each sector is 4096 bytes. In this example, 32-bytes of additional information, including the error detection code (EDC) is added to the 4096-bytes of data such that the resulting 4128-bytes of data is formed into a 32-row, 129-column two-dimensional data matrix or array. In such case, since the data number in the column direction is 32 bytes, which is twice the data number k of 16 bytes of the data area 4, each data column of the two-dimensional data array is allocated to two data areas 4 without excess or shortage, while two servo signals SV are allotted to each column of the data array as indicated by the dotted line in FIG. 9.

It will be noted that each column data number can be set to any other value than that specified above. For example, in a modification shown in FIG. 10, 16-bytes of additional information, including the error detection code (EDC) is added to a 512-byte one-sector data to give 528-bytes of data, which are then divided by groups of 8 bytes and arranged sequentially in the column direction for forming an 8-row, 66-column two-dimensional data array. To each 66-byte row of the data array, a 16-byte error correction code ECC, such as a (82,66) Reed Solomon code is generated and affixed for forming an 8-row, 82-column two-dimensional data array. With the data number k of each data area 4 of the opto-magnetic disk recording medium 1 being equal to 16 bytes, the length m in the column direction of the two-dimensional data array is 8 bytes so that the relation m:k=1:2 holds and hence the two data columns of the two-dimensional data array can be allotted to each data area without excess or deficit. Thus the two data columns can be allocated to each data area so that each servo signal SV is allotted to two data columns of the data array as indicated by the broken line shown in FIG. 10.

Various modifications can be made within the scope of the present invention. For example, the present invention can be applied to disk-like recording media other than the opto-magnetic disk. The lengths in the row and column directions of the data array or the length of the data signal area are not limited to the specific values of the above embodiments but can be arbitrarily set on the condition that the ratio of m:k is equal the to ratio of 1 to an integer, i.e. m and k have an integer relationship with each other. By "integer relationship" is meant that the relation between the number of the data in the direction of reading of the two-dimensionally arrayed data and the data number that can be recorded in each data area provided on said disk-like recording medium is satisfied on the condition that one side of the numbers is an integer times the other side of the numbers.

It will be seen from above that, when a read-out error of the servo signal has been caused such that the data of a given data area is considered to be in error, the error range can be confined within the extent of the least number of the column or rows of the two-dimensional data array, so that the error correcting ability is correspondingly improved. When the read-out error of the servo signal has been cased and the error information is transmitted to an error correction processing unit (ECC), the error is not situated across two rows or columns, so that the handling for error correction is facilitated. In addition, since the total number of the two-dimensional data array may be divided by the data number of the data area so that no data fragments are produced, address and data signals are not recorded in an admixture in the data area such that it becomes unnecessary to perform the switching operation between the address and data signals at the time of reproduction.

Although the present invention has been shown and described with respect to preferred embodiments, various changes and modifications which are obvious to a person skilled in the art to which the invention pertains are deemed to lie within the spirit and scope of the invention.

What is claimed is:

1. An optical recording method for sampled servo format, said method being of the type which includes the steps of:
    (a) generating and adding parity data along at least one direction of a two-dimensionally arrayed block of data supplied for recording, said parity data being used for correcting a possible error of said block of data; and
    (b) serially reading said two-dimensionally arrayed data affixed with said parity data in the other direction, orthogonal to said one direction, and recording the read-out data in respective data areas, each of which is capable of recording a prescribed number k of data, and which are formed along each track, alternately with servo signal areas, on a disk-like recording medium;
    wherein the improvement resides in that the number m of the data in the direction of reading of the two-dimensionally arrayed data is selected to have an integer relationship with the data number k that can be recorded in each data area provide on said disk-like recording medium and said integer is selected from among 1, 2, 3 or 4 on the condition that the number of data in said other direction of said two-dimensionally arrayed data is equal to an integer.

2. An optical recording method for sampled servo format, said method being of the type which includes the steps of:
    (a) generating and adding parity data along at least one direction of a two-dimensionally arrayed block of data supplied for recording, said parity data being used for correcting a possible error of said block of data; and
    (b) serially reading said two-dimensionally arrayed data affixed with said parity data in the other direction, orthogonal to said one direction, and recording the read-out data in respective data areas, each of which is capable of recording a prescribed number k of data, and which are formed along each track, alternately with servo signal areas, on a disk-like recording medium;
    wherein the improvement resides in that the number m of the data in the direction of reading of the two-dimensionally arrayed data is selected to have an integer relationship with the data number k that can be recorded in each data area provided on said disk-like recording medium and wherein, for harmonizing servo characteristics with the effect of interleaving on burst errors, the number of data in said other direction of said two-dimensionally arrayed data is selected from among 4, 8, 16, 32 or 48 bytes when the number of data that can be recorded on each data area is equal to 16 bytes.

3. An optical recording method for sampled servo format, said method being of the type which includes the steps of:
    (a) generating and adding first parity data along at least one direction of a two-dimensionally arrayed block of data supplied for recording, said first parity data being used for correcting a possible error of said block of data;
    (b) generating and adding second parity data along said other direction of the two-dimensionally arrayed block of data supplied for recording, said second parity data being used for correcting possible errors of the block of data; and
    (c) serially reading said two-dimensionally arrayed data affixed with said first and second parity data in the other direction, orthogonal to said one direction, and recording the read-out data in respective data areas, each of which is capable of recording a prescribed number k of data, and which are formed along each track, alternately with servo signal areas, on a disk-like recording medium;
    wherein the improvement resides in that the number m of the data in the direction of reading of the two-dimensionally arrayed data is selected to have an integer relationship with the data number k that can be recorded in each data area provided on said disk-like recording medium and wherein, for harmonizing servo characteristics with the error correcting ability of the second parity data generated and added in said other direction of said two-dimensionally arrayed data, the number of data in said other direction is set so as to be equal to 48 bytes when the number of data that can be recorded in each data block is equal to 16 bytes.

4. An optical recording method for sampled servo format, said method being of the type which includes the steps of:
(a) generating and adding parity data along at least one direction of a two-dimensionally arrayed block of data supplied for recording, said parity data being used for correcting a possible error of said block of data; and
(b) serially reading said two-dimensionally arrayed data affixed with said parity data in the other direction, orthogonal to said one direction, and recording the read-out data in respective data areas, each of which is capable of recording a prescribed number k of data, and which are formed along each track, alternately with servo signal areas, on a disk-like recording medium;
wherein the improvement resides in that the number m of the data in the direction of reading of the two-dimensionally arrayed data is selected to have an integer relationship with the data number k that can be recorded in each data area provided on said disk-like recording medium and the number of each parity data generated and added along one direction of said two-dimensionally arrayed data is equal to 16 bytes.

5. An optical recording method for sampled servo format, said method being of the type which includes the steps of:
(a) generating and adding first parity data along at least one direction of a two-dimensionally arrayed block of data supplied for recording, said first parity data being used for correcting a possible error of said block of data;
(b) generating and adding second parity data along said other direction of the two-dimensionally arrayed block of data supplied for recording, said second parity data being used for correcting possible errors of the block of data; and
(c) serially reading said two-dimensionally arrayed data affixed with said first and second parity data in the other direction, orthogonal to said one direction, and recording the read-out data in respective data areas, each of which is capable of recording a prescribed number k of data, and which are formed along each track, alternately with servo signal areas, on a disk-like recording medium;
wherein the improvement resides in that the number m of the data in the direction of reading of the two-dimensionally arrayed data is selected to have an integer relationship with the data number k that can be recorded in each data area provided on said disk-like recording medium and the number of the first parity data generated and added in one direction of said two-dimensionally arrayed data is 2 bytes and the number of the second parity data generated and added in the other direction is 4 bytes.

6. An optical recording method for sampled servo format, said method being of the type which includes the steps of:
(a) generating and adding parity data along at least one direction of a two-dimensionally arrayed block of data supplied for recording, said parity data being used for correcting a possible error of said block of data; and
(b) serially reading said two-dimensionally arrayed data affixed with said parity data in the other direction, orthogonal to said one direction, and recording the read-out data in respective data areas, each of which is capable of recording a prescribed number k of data, and which are formed along each track, alternately with servo signal areas, on a disk-like recording medium;
wherein the improvement resides in that the number m of the data in the direction of reading of the two-dimensionally arrayed data is selected to have an integer relationship with the data number k that can be recorded in each data area provided on said disk-like recording medium and m is at least N times k, where N is an integer.

7. A method according to claim 6 where N is greater than 2.

* * * * *